(12) United States Patent
Swart et al.

(10) Patent No.: US 6,643,574 B1
(45) Date of Patent: Nov. 4, 2003

(54) METHOD AND APPARATUS FOR CONTROLLING DATA TRANSMISSION BETWEEN TWO MODULES IN A MOTOR VEHICLE

(75) Inventors: Marten Swart, Obertraubling (DE); Anton Anthofer, Freihung (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/523,110

(22) Filed: Mar. 10, 2000

Related U.S. Application Data

(63) Continuation of application No. PCT/DE98/02155, filed on Jul. 29, 1998.

(51) Int. Cl.[7] .......................... B60R 22/48; B60R 22/46
(52) U.S. Cl. ........................................ 701/45; 280/735
(58) Field of Search ........................... 701/45, 1, 24, 701/35, 36; 280/734, 735; 710/1, 16, 20, 36

(56) References Cited

U.S. PATENT DOCUMENTS 4,967,389 A    10/1990   Omura et al.
5,522,040 A  *  5/1996   Hofsass et al. .............. 714/55
6,253,193 B1 *  6/2001   Ginter et al. ............... 705/57
6,408,998 B1 *  6/2002   Saito et al. .................. 191/2

FOREIGN PATENT DOCUMENTS

DE   38 11 217 A1   10/1989
DE   42 09 140 A1    9/1992
EP    0 471 871 A1    2/1992
EP    0 486 186 A1    5/1992
EP    0 576 018 A1   12/1993

* cited by examiner

Primary Examiner—William A. Cuchlinski, Jr.
Assistant Examiner—Olga Hernandez
(74) Attorney, Agent, or Firm—Laurence A. Greenberg; Werner H. Stemer; Ralph E. Locher

(57) ABSTRACT

The present invention relates to a method and an apparatus for controlling the data transmission between two modules which are present in a motor vehicle and are connected to one another via a communications interface and a communications bus. The transmitting module defines the data to be transmitted in the form of code words in dependence on sensor signals generated by a first sensor and a second, redundant sensor, the sensor signal of one of the two sensors being applied directly to the communications interface of the module and serving for checking and/or changing part of the code word applied to the communications interface for the purpose of transmission.

15 Claims, 1 Drawing Sheet

Figure 1:
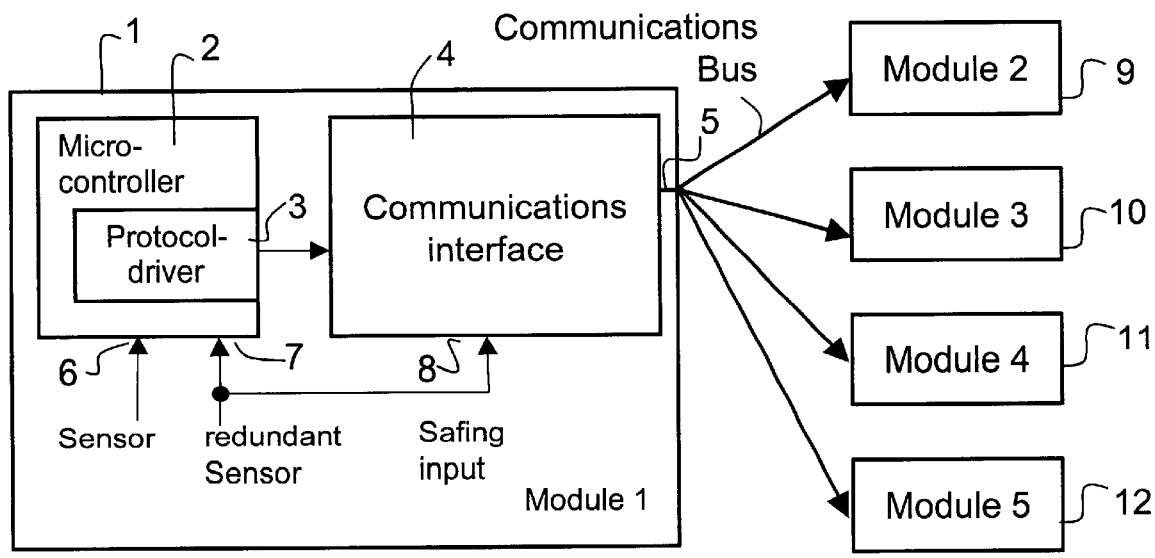

METHOD AND APPARATUS FOR CONTROLLING DATA TRANSMISSION BETWEEN TWO MODULES IN A MOTOR VEHICLE

CROSS-REFERENCE TO RELATED APPLICATION

This is a continuation of copending international application PCT/DE98/02155, filed Jul. 29, 1998, which designated the United States.

BACKGROUND OF THE INVENTION

FIELD OF THE INVENTION

The invention lies in the automotive technology field. More specifically, the invention relates to a method and an apparatus for controlling the data transmission between two modules present in a motor vehicle, in particular between a control unit and an activation circuit of an occupant protection system.

The instantly described invention is based on the disclosure in European patent application EP 0 471 871 A1. There is described a method for controlling the data transmission between two modules present in a motor vehicle, in particular between a control unit and at least one firing unit of a motor vehicle occupant protection system. The modules are connected to one another via a communications interface and a communications bus. The first module defines the data to be transmitted in the form of code words in dependence on sensor signals generated by a first sensor and a second sensor, which is present as a redundant sensor. The known apparatus is designed as an occupant protection system with a central control unit and remote firing circuits. In the event of an impact (crash) detected by the sensors, the central control unit outputs firing commands, for example in the form of code words, to one or more firing circuits. The use of code words (by comparison with simply impressing a positive potential on the data line leading from the control unit to the relevant firing circuit) affords the advantage of preventing a possible unintended short circuit of the data line with the battery voltage from resulting in undesirable triggering of the occupant protection unit, for example the airbag or the seat belt pretensioner.

It is generally true in this context that increasingly, instead of parallel wiring, serial multiplex communications buses (for example usually CAN in motor vehicles, a squib bus for activation of the firing pellet, an Instabus, etc.) are being used for data exchange and for communication between the individual modules in the motor vehicle. For the data transmission, there is often a microcontroller present which compiles the data on the basis of the applied input variables, for example process parameters or sensor signals, and outputs them to other modules/units via the multiplex communications bus.

When a communications bus is used, it is usually driven via a hardware communications interface. The interface, by way of example, may be designed as a shift register and be controlled by a control device, in particular in the form of a microcontroller.

In this connection, particularly important and safety-critical input data are usually safeguarded by redundant sensors, resulting in sensor pairs comprising the actual sensor and associated safing sensor. In the case of occupant protection systems, in particular, in order to avoid erroneous triggering, there is provided in addition to the actual sensor, for example the acceleration sensor, a further, redundant sensor (safing sensor), for example in the form of a mechanical acceleration switch or of a further acceleration sensor, which responds only when a minimum value of the quantity to be detected, that is to say a minimum acceleration, occurs. The control unit controlling the generation of the activation signal, for example an airbag firing signal, generates the activation signal only when both sensors indicate an impact. The control unit thus performs an AND combination of the two sensor signals.

A problem that is generally posed in this connection is that of safeguarding the communication against errors. The data transmission itself can be safeguarded by means of corresponding protocol configuration, in particular by the addition of error detection codes, redundancy bits and the like, with the result that any errors that have occurred in the course of the data transmission can be detected at the receiver end and the transmitted code word is consequently rejected.

However, if the microcontroller itself erroneously generates the information packet that is to be transmitted and is protected by an error detection code, on account of internal malfunctions that may be caused by hardware defects or by software errors, these errors cannot generally be detected. Even when not only the actual sensor signal but also the signal of the additional redundant sensor is fed to the microcontroller, there is the risk that the microcontroller will generate an erroneous activation signal given an internal malfunction, that is to say there is the risk that an unnecessary firing signal will be put onto the bus even there is not a danger situation.

To afford improved protection against such malfunctions, consideration might be given to providing at least one further, redundant microcontroller and forwarding a firing signal only when all the microcontrollers generate the firing signal identically. However, that solution approach is very costly and, moreover, can only be implemented with difficulties in terms of the technology.

SUMMARY OF THE INVENTION

The object of the invention is to provide a method and a device for controlling the data transfer between two modules in a motor vehicle which overcomes the above-noted deficiencies and disadvantages of the prior art devices and methods of this kind, and which affords increased protection against the transmission of erroneous activation signals.

With the above and other objects in view there is provided, in accordance with the invention, a method of controlling data transmission between two modules in a motor vehicle, which comprises:

providing first and second modules connected to one another via a communications bus;

generating sensor signals with a first sensor and a second sensor, applying the sensor signals to the first module, and applying one of the sensor signals to a communications interface of the first module;

defining, with the first module, data to be transmitted in the form of code words in dependence on the sensor signals received from the first sensor and the second sensor;

evaluating the sensor signal applied to the communications interface of the first module for checking and/or changing a part of the code word applied to the communications interface for transmission via the communications bus.

In accordance with an added feature of the invention, the first module is a control unit and the second unit is one or more firing units of a motor vehicle occupant protection system.

In accordance with an additional feature of the invention, the sensor signal applied to the communications interface is a binary signal, and the method comprises comparing a value of the binary signal with an information section of the code word, the information section controlling an activation of the second module, and converting the information section or another part of the code word if the values in the communications interface deviate from one another.

In accordance with a further feature of the invention, the sensor signal applied to the communications interface is a binary signal, and the method comprises replacing an information section of the code word controlling an activation of the second module with the sensor signal.

In accordance with another feature of the invention, the sensor signal applied to the communications interface contains a single bit.

In accordance with a further feature of the invention, the code word contains an error detection code and the second module is equipped with an error detection function, and the method comprises not altering the error detection code even if an information section of the code word is changed.

In accordance with again a further feature of the invention, the occupant protection system (e.g., airbag system) is a system with a central control unit and remote firing circuits, and the defining step comprises forming a code word with an activation bit for controlling an activation of at least one of the firing circuits.

With the above and other objects in view there is also provided, in accordance with the invention, a data transmission control apparatus in a motor vehicle (e.g., a control unit and a firing unit of an occupant protection system), comprising:

- a first module having a first sensor input, a second sensor input, and a communications interface;
- a second module;
- a communications bus connecting the second module to the first module via the communications interface;
- the first module defining data to be transmitted via the communications bus in form of code words in dependence on sensor signals received via the first and second sensor inputs;
- the communications interface having a safing sensor input commonly connected to one of the first and second sensor input, and a device adapted to change a part of the code word in dependence on the sensor signal applied to the communications interface.

In accordance with again an added feature of the invention, the code words include an information section and an error detection code, and the control device accessing only the information section for changing the code word.

In accordance with again an additional feature of the invention, the first module includes a microcontroller for generating the code words, and the microcontroller is connected to at least one the sensor inputs.

In accordance with a concomitant feature of the invention, the occupant protection system is a system with a central control unit and remote firing units, such as an airbag system, and the code word contains ns an activation bit for controlling an activation of at least one of the firing units.

In the case of the present invention, then, not only the code word formed by the first module, in particular the central control unit, but also one of the two sensor signals is applied to the communications interface. Consequently, in the communications interface it is still possible to check and/or change at least part of the code word before the latter has actually been transmitted. If, by way of example, the sensor signal applied to the communications interface does not indicate a need for activation but activation is signaled in the code word to be transmitted, the corresponding information section, which may comprise one or more bits, can be correspondingly changed. If, by way of example, the communications interface contains a shift register to which the code word is written before it is transmitted, only those shift register locations which hold the information section of the code word that commands activation or lack of activation have to be taken into consideration. If the sensor signal applied to the communications interface signals the need for activation and such activation is likewise commanded correctly in the code word, it is not necessary to change the code word. The same applies if the code word does not signal activation. In this case, too, the code word can remain unchanged since the other sensor signal that was evaluated during the formation of the code word then evidently did not indicate a danger situation.

If, by contrast, the sensor signal applied to the communications interface signals the lack of a need for activation, this information can be used to convert an information item that may be present in the code word and commands activation, with the result that the code word then transmitted no longer commands activation.

If, as an example, in the simplest case, one bit in the code word represents the activation signal, for example a firing signal, which is held at a specific location in the shift register, when the sensor signal passed to the communications interface signals a "1" (activation), the corresponding bit in the shift register can be left unchanged, whereas when the sensor signal applied to the communications interface signals a "0" (no activation), the corresponding shift register location is set to this value, irrespective of whether a "1" or a "0" was hitherto held at that location.

If the code word is provided with an additional error detection code, the procedure explained above can be simplified even further by virtue of the fact that the activation signal bit of the code word is always overwritten by the bit value of the sensor signal applied to the communications interface. If the level of the bit hitherto located in the code word corresponds to the value of the sensor signal applied to the communications interface, the corresponding bit position remains unchanged, with the result that the error detection code also continues to be applicable and the addressed module can evaluate the information. However, if the previous bit value of the activation bit in the code word has a different value from the sensor signal applied to the communications interface, the corresponding bit position is transcribed, with the result that the error detection code is no longer applicable to this changed bit section. The addressed unit recognizes this discrepancy between the data word and the assigned error detection code and can thus reject the data word as erroneous.

If the code word to be transmitted signals activation, but the sensor signal applied to the communications interface does not indicate a need for activation, it is also possible according to the invention to interfere with the code word in a targeted manner, that is to say to change one or more bit values, at a bit location other than in the activation section. At the receiver end, a discrepancy between information section and the error detection code is then likewise recognized and a firing operation is not performed.

In the case of the invention, then, the AND combination of the two sensor signals that has hitherto been carried out during the generation of the code word is moved to a point downstream of the code word generator (usually microcontroller) as near as possible to the communications bus, namely being realized in the communications interface.

Consequently, the invention makes it possible, in a simple manner, to increase the protection against undesirable activation signals, without high coding/decoding complexity being necessary. Specifically, the complete error detection code algorithm (CRC algorithm) of the microcontroller which generates the code word need not be simulated in the communications interface since the error detection code can be maintained unchanged in the communications interface. Furthermore, the invention realizes a communications safing function in which merely a portion of the code words (protocol frames) is accessed, with the result that the communications interface remains transparent to all other commands and signals in which the activation signal bit or bits can have any desired value. Consequently, the communication is not impaired.

The modules may be part of an occupant protection system which is designed as an airbag system, seat belt pretensioner system, roll bar protection system or the like and in which the activation of the firing pellets or other control members is controlled. However, the invention can also be applied to any other systems in which two or more sensors are provided for the measurement of the same parameter and the sensor signals are logically combined with one another in order to define the activation signal.

Other features which are considered as characteristic for the invention are set forth in the appended claims.

Although the invention is illustrated and described herein as embodied in method and a device for controlling the data transfer between two modules in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages hereof will be best understood from the following description of specific embodiments when read in connection with the accompanying drawings.

BRIEF DESCRIPTIONS OF THE DRAWINGS

Figure 2:
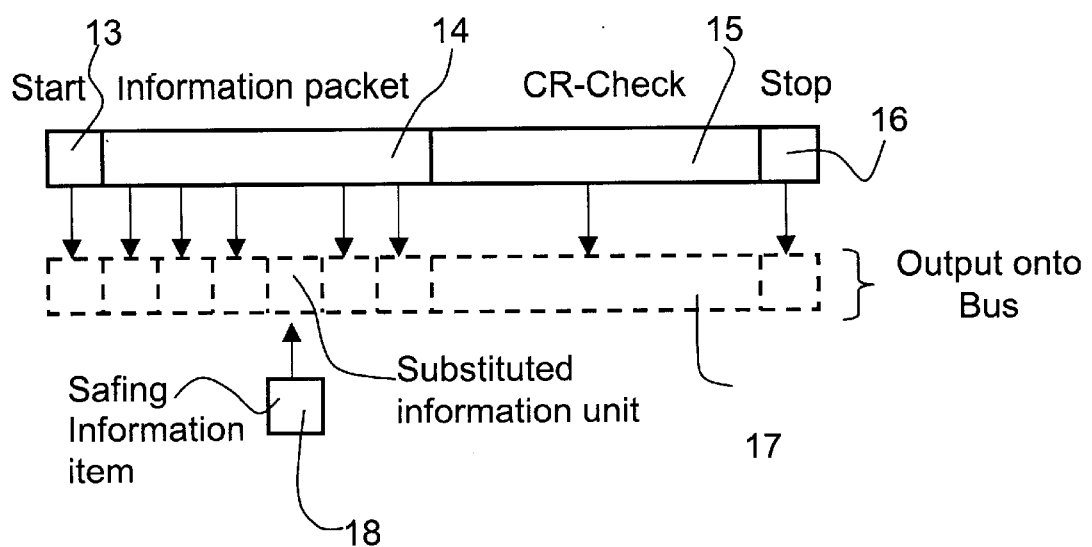

FIG. 1 is a block diagram of an exemplary embodiment of the apparatus according to the invention with a plurality of modules connected to one another via a communications bus; and FIG. 2 is a schematic of the structure and the composition of a code word (protocol frame).

DESCRIPTION OF THE PREFERRED EMBODIMENTS

Referring now to the figures of the drawing in detail and first, particularly, to FIG. 1 thereof, there is seen a module 1, which represents a central control unit of an occupant protection system, in particular of an airbag and/or seat belt pretensioner system. The module 1 is connected in a communications link to further modules (firing units) 9, 10, 11 and 12 via a communications bus 5. The module 1 contains a microcontroller 2, to which is applied at least one sensor signal 6 generated by a sensor, in particular an acceleration sensor. In addition, a further sensor signal 7, representing the same parameter, of a further sensor (safing sensor), in particular an acceleration sensor or acceleration switch, can also be applied to the microcontroller 2. The microcontroller 2 in this case carries out an AND combination of the two sensor signals for the purpose of forming the activation signal, in particular the trigger signal or firing signal. The feeding in of the second sensor signal, that is to say of the safing sensor data or of the main sensor data, may alternatively be omitted.

Whenever the sensor signal or signals 6, 7 indicate an impact, the microcontroller 2 forms a code word intended to effect activation of the firing pellets of the occupant protection system. The code word, including an error detection code, is applied via a protocol driver 3 of the microcontroller 2 to a communications interface 4 of the module 1. The communications interface is connected to the serial multiplex communications bus 5 on the output side. The communications interface 4 has an additional input (safing input) 8, which receives the sensor signal 7 of the redundant sensor, or alternatively the sensor signal 6.

With reference to FIG. 2, the microcontroller 2 generates an information packet 14 from the sensor signals 6 and, if appropriate, additionally the data of the redundant (safing) sensor. In order to safeguard the communication, as already explained, the CRC check sum 15 (see FIG. 2) is calculated in the microcontroller 2 and attached to the information packet 14. In order to complete a complete protocol frame, the microcontroller 2 also adds start data 13 and stop data 16 and then transmits this complete code word (protocol frame) to the communications interface 4. The communications interface 4 has the task of converting these logical signals into the physical signals of the bus. The additional input 8 of the communications interface 4 serves for protocol safeguarding and acts on individual information units of the protocol frame 13 to 16, preferably on one or more bits (information units) of the information packet 14. This is because the structure of the information packet 14 is usually simpler to decrypt than the usually complex CRC check sum 15, thereby simplifying the logical processing in the communications interface 4.

If the microcontroller 2 operates correctly, the information packet 14 has a specific pattern depending on the useful information to be transmitted, that is to say on the sensor signal 6 (and/or 7). Since the sensor signal 7 (or 6) applied to the input 8 of the communications interface 4 represents the same parameter quantity and the same, equivalent output quantity is established for the same physical input quantity, the same information content is produced given a correct mode of operation, that is to say that the pattern of the information packet, insofar as this is governed by the sensor signal, can also be generated directly by the sensor signal applied to the communications interface 4. It is thus possible in this case to replace the corresponding portion (one or more bits) of the information packet 14 entirely or partly by the sensor signal that is fed in directly via the input 8, without the internal correctness of the entire protocol frame 13 to 16 being lost.

FIG. 2 schematically illustrates these facts. A code word 17 designed for outputting onto the communications bus 5 is formed from the code word (protocol frame) 13 to 16. The bit locations of the code word are identical to those of the code word 13 to 16, with the exception of a substituted information unit formed by a safing information item 18. This information item 18 may correspond to the firing command and is represented by the sensor signal applied to the input 8, if appropriate after internal conversion.

Should the microcontroller 2 operate incorrectly, however, and thus generate an incorrect information packet 14, with respect to which the associated CRC check sum 15 is formed, the information item representing the activation signal in the information packet 14, on the one hand, and the safing information item 18, on the other hand, differ from one another, with the result that the consistency of the code word 13 to 16 is disrupted since the transmitted information packet and the associated CRC check sum 15 no longer match. Any receiver receiving the code word recognizes this lack of correspondence between information packet 14 and CRC check sum 15 and can thus reject the entire code word as erroneous, that is to say does not perform the command that is actually prescribed. If appropriate, a receiver (module 9, 10, 11 or 12) which ascertains this erroneous nature of the code word can also generate an error signal which is reported back to the central control unit 1 or processed in another way, for example stored in an error table.

The substituted information unit may encompass a single bit, or it may contain a plurality of bits. Furthermore, it is possible, by means of a suitable structure of the information packet 14 and a suitable selection of the substituted information units, additionally to achieve the effect that not only individual information packets have to correlate, but also that groups of information packets yield consistent code words (protocol frames) for groups of safing information items.

It follows from the foregoing that, in accordance with the invention, the protection function (safing function) effected by the redundancy is implemented without a high outlay on hardware in the communications interface.

We claim:

1. A method of controlling data transmission between two modules in a motor vehicle, which comprises:
   providing first and second modules connected to one another via a communications bus;
   generating sensor signals with a first sensor and a second sensor, applying the sensor signals to the first module, and applying one of the sensor signals to a communications interface of the first module;
   defining, with the first module, data to be transmitted in the form of code words in dependence on the sensor signals received from the first sensor and the second sensor;
   evaluating the sensor signal applied to the communications interface of the first module for checking and/or changing a part of the code word applied to the communications interface for transmission via the communications bus.

2. The method according to claim 1, wherein the first module is a control unit and the second unit is at least one firing unit of a motor vehicle occupant protection system.

3. The method according to claim 1, wherein the sensor signal applied to the communications interface is a binary signal, and the method comprises comparing a value of the binary signal with an information section of the code word, said information section controlling an activation of the second module, and converting the information section or another part of the code word if the values in the communications interface deviate from one another.

4. The method according to claim 3, wherein the sensor signal applied to the communications interface contains a single bit.

5. The method according to claim 1, wherein the sensor signal applied to the communications interface is a binary signal, and the method comprises replacing an information section of the code word controlling an activation of the second module with the sensor signal.

6. The method according to claim 5, wherein the sensor signal applied to the communications interface contains a single bit.

7. The method according to claim 1, wherein the code word contains an error detection code and the second module is equipped with an error detection function, and the method comprises not altering the error detection code even if an information section of the code word is changed.

8. The method according to claim 2, wherein the occupant protection system is a system with a central control unit and remote firing circuits, and the defining step comprises forming a code word with an activation bit for controlling an activation of at least one of the firing circuits.

9. The method according to claim 2, wherein the occupant protection system is an airbag system with a central control unit and remote firing circuits, and the defining step comprises forming a code word with an activation bit for controlling a triggering of the airbag system.

10. A data transmission control apparatus in a motor vehicle, comprising:
    a first module having a first sensor input, a second sensor input, and a communications interface;
    a second module;
    a communications bus connecting said second module to said first module via said communications interface;
    said first module defining data to be transmitted via said communications bus in form of code words in dependence on sensor signals received via said first and second sensor inputs;
    said communications interface having a safing sensor input commonly connected to one of said first and second sensor input, and a device adapted to change a part of the code word in dependence on the sensor signal applied to the communications interface.

11. The apparatus according to claim 10, wherein said first module is a control unit and said second module is a firing unit of an occupant protection system of a motor vehicle.

12. The apparatus according to claim 10, wherein the code words include an information section and an error detection code, and said control device accessing only the information section for changing the code word.

13. The apparatus according to claim 10, wherein said first module includes a microcontroller for generating the code words, and said microcontroller is connected to at least one of said sensor inputs.

14. The apparatus according to claim 11, wherein the occupant protection system is a system with a central control unit and remote firing units, and the code word contains an activation bit for controlling an activation of at least one of said firing units.

15. The apparatus according to claim 14, wherein the occupant protection system is an airbag system.

* * * * *

UNITED STATES PATENT AND TRADEMARK OFFICE
CERTIFICATE OF CORRECTION

PATENT NO.     : 6,643,574 B1
DATED          : November 4, 2003
INVENTOR(S)    : Marten Swart et al.

It is certified that error appears in the above-identified patent and that said Letters Patent is hereby corrected as shown below:

<u>Title page,</u>
Item [30], Foreign Application Priority Data, should read as follows:
-- Sep. 10, 1997        (DE) ......... 197 39 808.1 --

Signed and Sealed this

Tenth Day of February, 2004

JON W. DUDAS
*Acting Director of the United States Patent and Trademark Office*